United States Patent [19]
Forcier

[11] Patent Number: 5,326,144
[45] Date of Patent: Jul. 5, 1994

[54] SEMITRAILER SLIDING TANDEM PIN PULLER

[76] Inventor: Clarence D. Forcier, 2330 Lexington Ave. S., Mendota Heights, Minn. 55120

[21] Appl. No.: 95,526
[22] Filed: Jul. 26, 1993
[51] Int. Cl.⁵ .............................................. B25B 5/14
[52] U.S. Cl. .................................. 294/19.1; 248/316.1
[58] Field of Search .................... 294/18, 19.1, 24, 26; 248/225.31, 227, 229, 231.4, 231.7, 316.1, 316.4; 213/205-207

[56] References Cited
U.S. PATENT DOCUMENTS

| | | | |
|---|---|---|---|
| 357,562 | 2/1887 | Snyder | 294/18 |
| 688,230 | 12/1901 | Isgrig et al. | 248/316.1 |
| 916,858 | 3/1909 | Geisking | 294/18 |
| 1,503,083 | 7/1924 | Amey et al. | 248/316.1 X |
| 1,874,447 | 8/1932 | Clark | 213/205 X |
| 2,658,703 | 11/1953 | Brink et al. | 280/655 X |
| 3,644,951 | 2/1972 | Colburn | 294/24 X |
| 3,843,981 | 10/1974 | Verest | 294/24 X |
| 4,050,107 | 9/1977 | Parma | 204/24 X |
| 4,776,361 | 10/1988 | Staton | 294/24 X |
| 5,060,995 | 10/1991 | Goldstein et al. | 294/19.1 |

Primary Examiner—Dean J. Kramer
Attorney, Agent, or Firm—Thomas B. Tate

[57] ABSTRACT

A pin puller, comprising a spring, a clamp, and a handle, which is used to pull the pins on the sliding tandem of a semitrailer. The pin puller may also be provided with a guard and a wire which has a flag on one end. When the pins are pulled, the flag will stick out so that the driver can see the flag emerge beyond the side of the semitrailer.

1 Claim, 3 Drawing Sheets

SEMITRAILER SLIDING TANDEM PIN PULLER

SUMMARY AND BACKGROUND OF THE INVENTION

Truck semi-trailers are equipped with a sliding tandem frame which is slid to adjust the weight distribution of the cargo inside the semi-trailer. At the point on the semitrailer where the tandem wheels slide back and forth, there are four pins inside. These pins fit through openings in the flange-like frame on the side of the trailer box and extend to openings in the tandem frame. A handle is positioned underneath the pins and extending toward the outside of the trailer. The pins come in when the handle is pulled and the trailer frame slides on the tandem frame. In order for the tandem frame to slide, the holes must be lined up and the pins pulled out. If the pins are not lined up into the holes of the frame, the pins will stick and be hard to pull out. In this case, the semitrailer must be rocked back and forth until the pins line up. Usually the pins are pulled manually and generally two people are needed to do the job. The only known prior art device for pulling pins is a mule, which is air-operated and permanently affixed.

The present invention is a pin puller which has a spring which attaches to the aforementioned frame handle, a clamp which fits onto the edge of the trailer, and a handle which tightens the clamp. The object of the invention is to provide an easier method for pulling the pins, applying pressure on the pins so that when the tandem is rocked, the pins will line up more readily.

DESCRIPTION OF THE INVENTION

Figure 1:
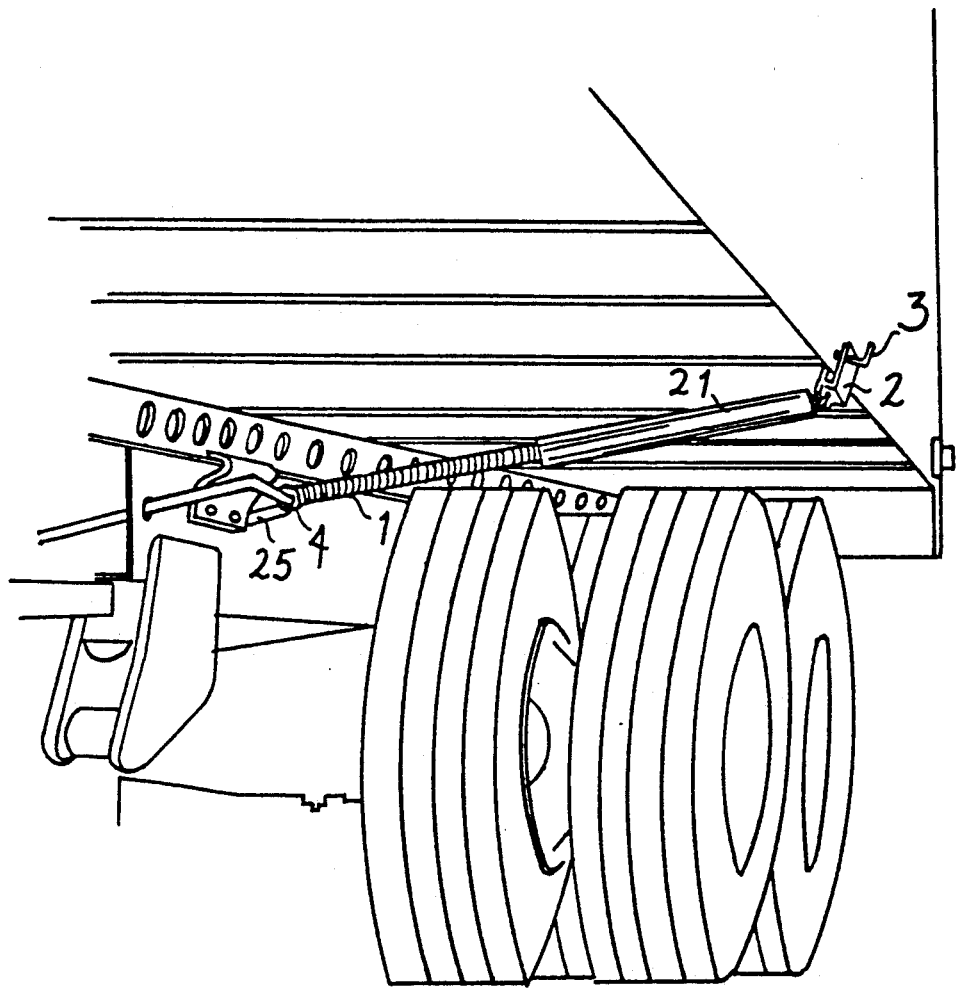
FIG. 1 is a sectional view of the back of a semitrailer, showing the invention in position.
Figure 2:
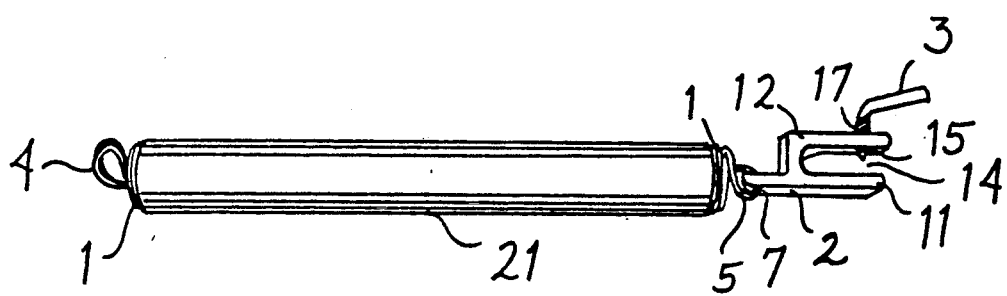
FIG. 2 is a front view of the principal embodiment of the invention.
Figure 3:
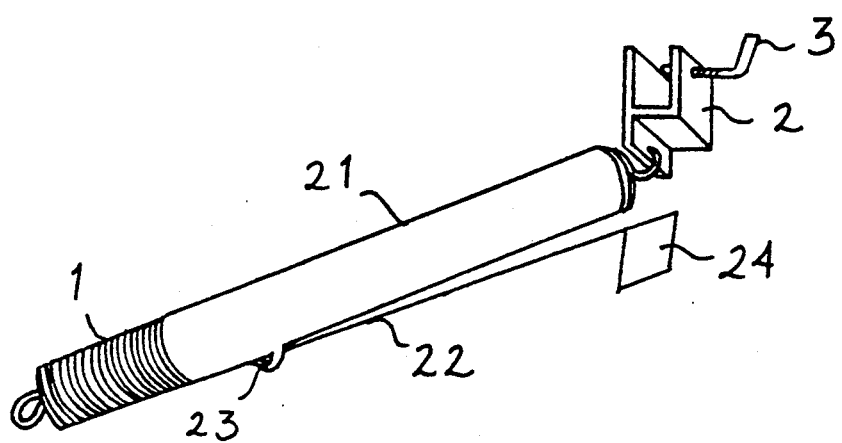
FIG. 3 is a front perspective view of the version of the invention which includes a signal flag.

The pin puller comprises a spring 1, a clamp 2, and a handle 3. The spring 1 is preferably the ⅛ inch wire size with 80 pull, and is approximately eleven inches long. The spring 1 has a ring 4 at one end which attaches around the end of the handle 25 of the semitrailer frame, and has a hook 5 at the opposite end which attaches to the clamp 2 through an opening 7 in the clamp 2.

The clamp 2 is made of metal, preferably malleable iron. The clamp 2 comprises a first piece 11 which is approximately 2½ inches long, and a second piece 12 which is L-shaped and is welded to the first piece 11. The opening 7 through which the hook 5 of spring 1 fits is located on this part of first piece 11 below second piece 12. The L-shaped second piece 12 is positioned so that the short side is perpendicular to the first piece 11 and the long side is parallel to first piece 11, thus leaving a U-shaped space 14 approximately ⅜ inch across between first piece 11 and the parallel portion of second piece 12. The clamp 2 fits onto the edge of the semitrailer such that the semitrailer edge is fitted into the U-shaped space 14 with first piece 11 to the inside and second piece 12 underneath and to the outside. There is a threaded opening 15 formed into the long side of second piece 12.

The handle 3 is fitted into opening 15. The handle 3 includes a threaded locking stud 17 which is screwed into opening 15 and which is perpendicular to the handle 3. The sides of handle 3 are flattened. The handle 3 is preferably made of metal, and is used to tighten the clamp 2 onto the semitrailer frame.

To use the device, the ring end 4 of the spring 1 is slid on over the end of semitrailer frame handle 25, the spring 1 is extended, and the clamp 2 is hooked into position on the edge of the semitrailer frame. Extending the spring 1 applies pressure on the pins so that when the tandem frame is rocked, the pins will line up.

Optional features may be added. A guard 21 made of PVC plastic, hollow and generally tubular but of slightly greater diameter at one end, can be fit over the spring 1. A wire 22 can be tied around the spring 1, then be passed through an eye 23 formed into the guard 21 and continue to extend along the outside of the guard 21. The wire 22 has a small plastic flag 24, preferably yellow in color, at its distal end. When the spring 1 pulls the pins, the flag 24 will stick out so that the driver can see the flag 24 emerge beyond the side of the semitrailer.

I claim:

1. A device for pulling the pins of the sliding tandem frame of a truck semitrailer, said device comprising:

a spring having a ring at one end and a hook at the opposite end thereof;

a clamp comprising a first straight piece and a second generally L-shaped piece, wherein the shorter side of said second L-shaped piece is perpendicular to said first piece and the longer side of said second L-shaped piece is parallel to said first piece and defines a generally U-shaped space between itself and said first piece;

said clamp having defined into it a first opening in said first straight piece into which said hook of said spring is inserted, and a second opening defined into said longer side of said second L-shaped piece;

a combination locking stud and handle, wherein said locking stud is threaded and fits into said second opening defined into said clamp, and wherein said handle is formed perpendicular to said locking stud and wherein said handle has flattened sides;

a hollow, generally tubular guard fitted over said spring;

and a wire having a signal flag at one end, wherein said wire is tied around said spring and is passed to the outside through an eye formed into said guard, said wire extending a sufficient length so that said flag will extend beyond the semitrailer frame when the pins of the sliding tandem are pulled.

* * * * *